United States Patent [19]

van der Lely

[11] Patent Number: 4,619,106
[45] Date of Patent: Oct. 28, 1986

[54] BALERS

[75] Inventor: Cornelis van der Lely, Zug, Switzerland

[73] Assignee: C. van der Lely N.V., Maasland, Netherlands

[21] Appl. No.: 676,306

[22] Filed: Nov. 29, 1984

[30] Foreign Application Priority Data

Dec. 1, 1983 [NL] Netherlands ............ 8304137

[51] Int. Cl.[4] ............................................ A01D 39/00
[52] U.S. Cl. ........................................ 56/341; 100/89
[58] Field of Search ................ 56/341, 343; 100/88, 100/89; 74/325; 242/172

[56] References Cited

U.S. PATENT DOCUMENTS 363,776   5/1887  Sweet ................................. 74/325
4,067,441 1/1978  Newman et al. ................ 242/172
4,121,513 10/1978 Kopaska ........................... 56/341
4,288,971 9/1981  McClure ........................... 56/341

Primary Examiner—Gene Mancene
Assistant Examiner—David I. Tarnoff
Attorney, Agent, or Firm—Penrose Lucas Albright

[57] ABSTRACT

Instead of being bound by being wrapped with twine, wire or plastics sheeting, relatively large bales of crop formed by winding are made cohesive by pressing a pushing or penetrating member into the bales as the outer layers are formed. The pushing member forces stalks from each layer of crop into inner layers, to achieve a plaited or braided effect that keeps the bale intact.

In another embodiment U-shaped binding elements are shot into the bale for holding the bale together after it has been formed.

45 Claims, 10 Drawing Figures

BALERS

FIELD OF THE INVENTION

This invention relates to balers.

BACKGROUND AND PRIOR ART

In known balers, and particularly to balers which wind large bales and means applied to the bales for retaining same intact without using wire, twine or plastic sheet the formed bales are kept intact by winding twine, cord of the like around their outer peripheries. The rope or wire, particularly iron wire, can be removed only with difficuly and may get mixed up with the crop and so get into the cattle's stomach so that difficulties may arise in the animal's body. Moreover, binding the bales in the known balers is time consuming, and wastes time which could otherwise be used for forming bales. Instead, travel of the baler across the field has to be interrupted during the binding operation.

SUMMARY OF THE INVENTION

According to one aspect of the present invention there is provided a baler comprising a pick-up device for picking up crop lying on the ground and a bale forming space, the baler being characterized by the absence of means for binding formed bales by wrapping twine, wire, plastics sheet of the like around the bale.

According to a second aspect of the present invention there is provided a baler comprising a pick-up device for picking up crop lying on the ground, a bale forming space and binding means which comprises a pushing member adapted to displace stalks of a layer of crop of a bale in the direction towards a further layer of crop of the bale.

According to a third aspect of the present invention there is provided a baler comprising a pick-up device for picking up crop lying on the ground, a bale forming space and a plurality of binding elements for insertion into a bale thereby to secure together several layers of crop in the bale.

According to a fourth aspect of the present invention there is provided a baler comprising a pick-up device for picking up crop lying on the ground, a bale forming space and a binding mechanism for displacing a binding element inwardly of a bale thereby to interconnect layers of crop.

According to a fifth aspect of the present invention there is provided a baler comprising a pick-up device for picking up crop lying on the ground, a bale forming space and two co-operating rollers disposed near the pick-up device, between which rollers crop can be compressed.

According to a sixth aspect of the present invention there is provided a method of binding a bale of crop, wherein a binding element is inserted into the bale in the direction towards the center of the bale, thereby to bind together a plurality of layers of crop in the bale.

According to a seventh aspect of the present invention there is provided a binding element which is adapted to be inserted into a bale of crop thereby to bind the bale.

According to an eighth aspect of the present invention there is provided a method of making large bales of crop, in which the crop is picked up from the ground and compressed into a bale, the stalks of the crop being pressed towards one another during formation of the bale whereby binding means for winding around the bale can be dispensed with.

DETAILED DESCRIPTION OF PREFERRED EMBODIMENTS

Figure 1:
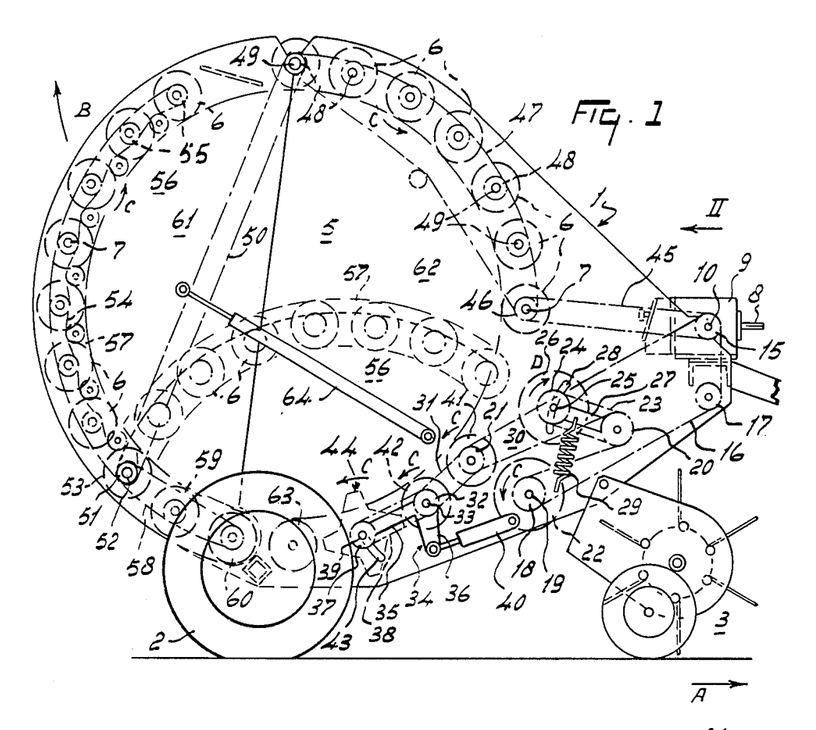
FIG. 1 is a side view of a baler.
Figure 2:
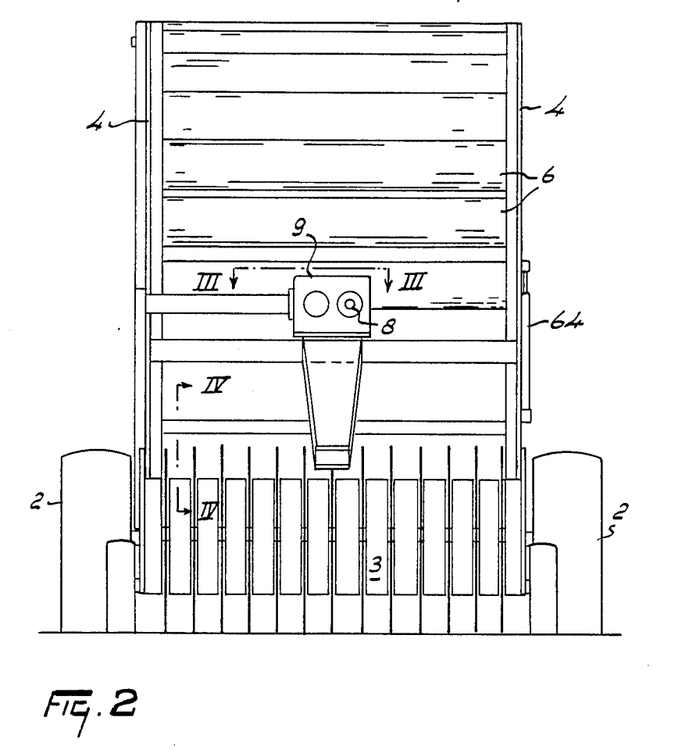
FIG. 2 is a front view of the baler taken in the direction of the arrow II in FIG. 1.

The baler shown in FIGS. 1 and 2 has a frame 1 which supports other parts of the baler and is supported by ground wheels 2 provided on both sides of the baler. Near the front and towards the bottom of the baler there is a pick-up device 3 of known kind for picking up crop lying on the field, the crop being fed to a bale forming or bale pressing space 5 bounded at the sides by two spaced, parallel side walls 4 which extend substantially vertically. The bale forming space 5 has a further boundary which is approximately cylindrical with a substantially horizontal axis extending transversely of the intended direction of operative travel A. This boundary has a plurality of crop displacing members in the form of cylindrical rollers 6, which are drivable about mutually parallel, substantially horizontal axes 7 extending transversely of the direction A. These rollers 7 are driven from a power take-off shaft of a tractor towing the baler, which shaft is coupled by an auxiliary shaft (not shown) to an input shaft 8 of a drive casing 9 arranged centrally at the front of the baler. The drive casing 9 has an output shaft 10, which projects horizontally towards one of the side walls 4.

Figure 3:
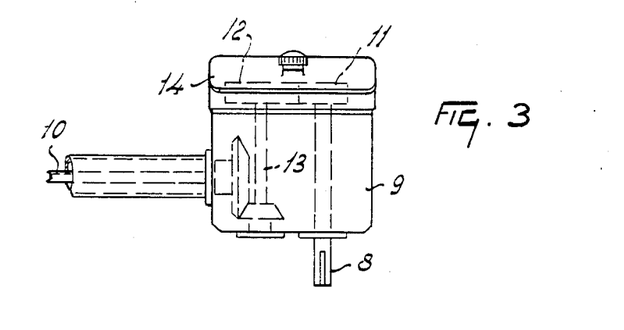
FIG. 3 is a fragmentary plan view taken on the line III—III in FIG. 2.

The transmission ratio between the input shaft 8 and the output shaft 10 can be selected from many values by making adjustments in the drive casing 9. As shown in FIG. 3, the input shaft 8 has at its rear end a gear wheel 11 which is in mesh with a gear wheel 12 fastened to a shaft 13 arranged to one side of and parallel to the shaft 8. The shaft 13 is coupled by means of a bevel gear wheel transmission with the output shaft 10. The gear wheels 11 and 12 are rotationally fixed to their shafts 8 and 13 by means of axial key ways or splines on the shafts, but they can be slipped off their shafts 8 and 13. For this purpose the gear wheels 11 and 12 are situated in a part of the casing 9 which is covered by a removable cover 14. When the cover 14 is removed, the gear wheels 11 and 12, having pitch circles of different diameters, can be slipped from their shafts and interchanged so that the gear wheel 11 will be on the shaft 13 and the gear wheel 12 on the shaft 8. In this way the transmision ratio between the input shaft 8 and the output shaft 10 is changed. The gear wheels 11 and 12 may also be replaced by a different pair of gear wheels, the pitch circles of which have a ratio differing from that of the gear wheels 11 and 12. These gear wheels are also interchangeable with each other so that, by providing various sets of gear wheels, many different transmission ratios can be obtained between the input shaft 8 and the output shaft 10. Since the output shaft 10, as will be described later, drives the rollers 6 forming a boundary of the bale forming space 5, this drivable boundary of the space 5 can be driven at different speeds. This means that winding up of the crop can be adapted to the nature of the crop. Some kinds of crop have to be wound at relatively low speed, whereas other kinds of crop can be wound at a higher speed. In the latter case, it is not necessary to operate at the relatively low speed, and so considerable time can be saved.

The cylindrical rollers 6 extending between the two side walls 4 are driven as follows. The end of the output shaft 10 away from the drive casing 9 is provided with a sprocket 15 situated on the outboard side of the side wall 4 visible in FIG. 1. A chain 16 runs over the sprocket 15 and over an intermediate wheel 17 and a chain sprocket 18, which is rotatable about a shaft 19. The shaft 19 is provided in the lower front region of the baler and extends across the whole width between the two side walls 4 like the drive shafts to be described in detail later. The chain 16 slopes forwardly and upwardly from the sprocket 18 and runs around an intermediate wheel 20. It then slopes rearwardly and downwardly again and runs around a sprocket 21, after which it returns to the sprocket 15. The sprockets 17, 18, 20 and 21 are situated on the outboard side of the side wall 4. The shaft 19 extends through a cylindrical pressing roller 22 which extends across th entire width between the side walls 4. The intermediate wheel 20 is a double wheel, one part of which carries a chain 23, which runs over a sprocket 24 fastened to a shaft 25. The shaft 25 extends through a pressing roller 26, the diameter of which (about thirty centimeters) is substantially equal to that of the pressing roller 22. The shaft 25 of the sprocket 24 and of the pressing roller 26 is connected, on the outboard side of the side wall 4, to the rotary shaft of the intermediate wheel 20 by a carrier 27. The rotary shaft of the intermediate wheel 20 is held relatively stationary in the side wall 4. The end of the shaft 25 is movable in an arcuate slot 28 in the side wall 4, which is centered on the shaft of the intermediate wheel 20. In this way the pressing roller 26 can turn upwards and downwards about the centerline of the shaft of the intermediate wheel 20. The carrier 27 is biassed downwardly towards the pressing roller 22 by tension springs 29 disposed on the outboard sides of the side walls 4. The pressing roller 26 is disposed above the pressing roller 22 and the two rollers define an inlet opening 30 between their peripheries for introducing crop fed by the pick-up device 3. The surfaces of the pressing rollers 22 and 26 may be smooth or slightly milled.

The sprocket 21, which is a double sprocket, drives a sprocket 32 by means of a chain 31. Levers 34 are pivotable about the rotary shaft 33 of the sprocket 32. The levers 34 are situated on the outboard sides of the two side walls 4. Each lever 34 has a rearwardly directed arm 35, which slopes downwards away from the shaft 33, and a downwardly directed arm 36. The rear end of the rearwardly directed arm 35 of the lever visible in FIG. 1 is provided with a sprocket 37, which is drivable from the double sprocket 32 by means of a chain 38. The sprocket 37 is mounted on a shaft 39 which extends across the whole width between the side walls 4 and is parallel to the centerline of the bale forming space 5. The shaft 39 is supported at its other end by a corresponding lever 34 disposed outside the other side wall 4. The lower ends of the arms 36 of the two levers 34 are connected to the ends of associated hydraulic rams 40, the other ends of which are supported at the lower edges of the side walls. The rams 40 can be actuated from the tractor towing the baler. A crop displacing roller 41 is mounted on the shaft of the sprocket 21 and extends between the side walls 4. The roller 41 can be driven from the sprocket 21. Another crop displacing roller 42 is mounted on the shaft of the sprocket 32 and also extends between the side walls 4. It can be driven from the sprocket 32. The rollers 41 and 42 define part of the bottom of the bale forming space 5, the roller 42 being positioned behind and slightly lower than the roller 41.

When the hydraulic ram 40 is actuated, the lever 34 turns about the shaft 33, and the shaft 39, extending across the whole width between the side walls 4, moves along a slot 43 formed in the side walls 4 and centered on the centerline of the shaft 33. The part of the shaft 39 disposed between the side walls 4 carries a pushing member 44 which will be described later. The pushing member 44 is rotatable by the above-described chain drive acting on the sprocket 37 mounted on the part of the shaft 39 projecting from the side wall 4 which is visible in FIG. 1.

A chain 45 extends to the rear from the double sprocket 15 and drives a sprocket 46 on the outboard side of the side wall 4. The sprocket 46 is a double sprocket and drives through a chain 47 a plurality of sprockets 48. Seven sprockets 48 are shown in FIG. 1 and their shafts 49 lie, as shown in FIG. 1, on an arc which subtends an angle of about 90°. The shafts 49 extend across the width between the side walls 4 and embody the axes 7 of the rollers 6. The uppermost roller 6 lies approximately in the central vertical plane of the space 5 extending transversely of the direction A, when it has a cylindrical shape. The sprocket 48 of the uppermost roller 6 is a double sprocket and is drivably connected by a downwardly and rearwardly inclined chain 50 to a sprocket 51 situated on the outboard side of the side wall 4 at the rear lower region of the baler. The sprocket 51 is mounted on a shaft 52, which extends across the width between the side walls 4 and carries a crop displacing roller 53 situated between the side walls 4. On the inboard side of the side wall 4, the shaft 52 is also provided with a sprocket, which is drivably connected by a chain 54 to sprockets 55 provided on the inboard side of the side wall 4 and fastened to a rear group 56 of rollers 6 rotatable about the axes 7. In the embodiment of FIG. 1 the group 56 comprises eight rollers 6. The shafts of the group 56 are supported in a hollow carrier 57, which is provided on the inboard side of the other side wall 4 and which, as shown in FIG. 1, is arcuate, its ends subtending an angle of about 90°. The carrier 57 terminates at the topmost roller of the group 56. The chain 54 driving the rollers 6 of the group 56 runs inside the hollow carrier 57 and is supported between the axes 7 on the side facing into the bale forming space 5 by supporting rollers journalled in the carrier 57. The rollers 6 of the group 56 are, therefore, driven by the chain 50 from the sprocket 48 of the uppermost roller 6 of the front group of rollers.

The rollers 6 of the group 56, together with the carriers 57, are pivotable about the axis 7 of the lowermost roller 53 of the group 56 with respect to the side walls 4. They can turn forwardly about that pivotal axis into the position indicated by broken lines. The length of the pivotable group 56 is such that its free end, in the forwardly turned position, lies near that part of the boundary of the bale forming spae 5 which is on the opposite side of the space from the pivotal axis. The rollers 6 arranged on the front and top sides of the space 5 are firmly journalled in the side walls 4.

Two rollers 59 and 60 are driven from the sprocket 51 by means of a chain 58. The rollers 59 and 60 extend across the whole width of the bale forming space between the side walls 4 and are rigidly journalled in the side walls. The rollers 59 and 60 and the adjoining group 56 of rollers 6, together with the rear sections 61 of the side walls 4, can turn upwardly and to the rear in the direction B about the centerline of the uppermost roller 6. These components thus constitute a door which provides, in the upwardly tilted position, an outlet opening of the baler for discharging a completed bale.

The group of rollers 56 forming part of the door can turn independently of the door about the shaft 52 into the position indicated in FIG. 1 by broken lines. The roller 60 is the lowermost roller associated with the door. Between the roller 60 and the pushing member 44 is journalled a freely rotatable roller 63 in the fixed section 62 of the side walls 4.

The door 56,59,60,61 can be opened from the tractor towing the baler by actuating hydraulic rams 64 provided one on each side of the side walls 4. One end of each ram 64 is fastened to the pivotable section 61 of the side wall and other end is fastened to the fixed section 62 of the side wall.

Figure 4:
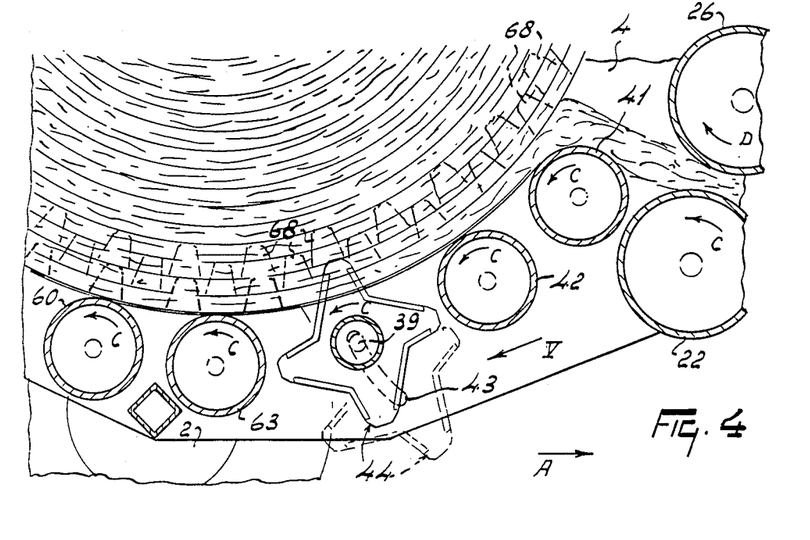
FIG. 4 is a sectional view taken on the line IV—IV in FIG. 2.
Figures 5, 6:
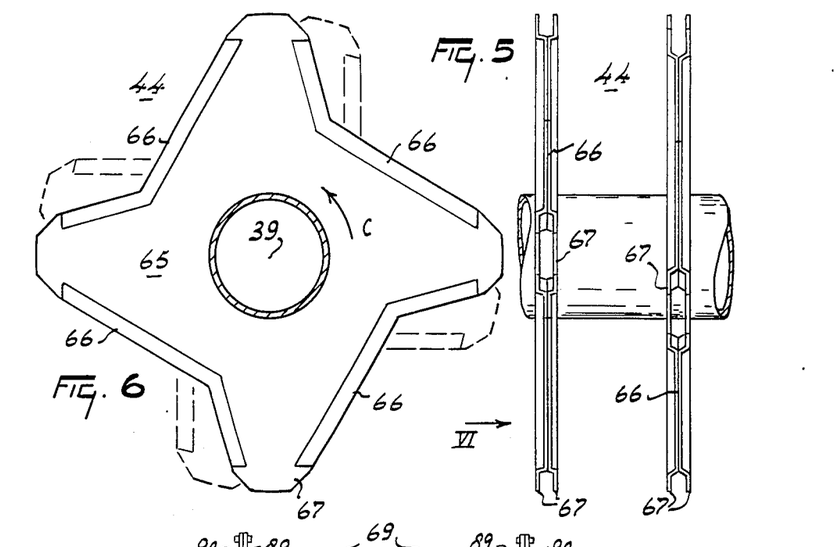
FIG. 5 is a fragmentary view taken in the direction of the arrow V in FIG. 4.
FIG. 6 is a view taken in the direction of the arrow VI in FIG. V.

All of the drivable rollers and the pushing member 44 can be driven in the direction C (FIG. 1), with the exception of the upper pressing roller 26, which can be driven in the direction D. For this reason the surface of the pressing roller 26 lies outside the cylindrical space defined by the surfaces of the other rollers, so the surface of a bale wound in the bale forming space 5 is not in contact with the surface of the pressing roller 26. This also applies to the pressing roller 22. The pushing member 44, which can be moved upwardly and downwardly by the hydraulic ram 40 (FIGS. 4,5 and 6) comprises a plurality of star-shaped pushing elements 65 mounted side by side a short distance apart on the shaft 39. Each element 65 is perpendicular to the length of the shaft 39 and to the centerline of the space 5. Each pushing element 65 comprises two mutually parallel steel plates which are a short distance apart from each other and have the general shape of a star as shown in FIG. 6. At regions 66 of their periphery they are bent towards each other and fastened together. In the region of their four projecting tips, the two plates are not fastened to each other so that, near these tips, the two plates project freely as edges 67 (FIG. 5). The pushing elements 65 are welded side by side to the shaft 39 so that each pushing element is angularly off-set by an angle of about 20° with respect to its neighbors. The row of pushing elements 65 project across the width between the side walls 4. The distance between adjacent pushing elements 65 of the pushing member 44 (FIG. 5) is about ten centimeters.

During operation, the baler is drawn by a tractor across the field, the input shaft 8 being coupled by an auxiliary shaft with a power take-off shaft of the tractor. The set of gear wheels 11 and 12 fitted in the drive casing 9 is previously selected to obtain a transmission ratio between the input shaft 8 and the output shaft 10 suitable for baling the particular crop lying on the field. The chain drive arrangement of the crop displacing rollers as described above results in the rollers 6,41,42,59 and 60 and the pushing member 44 being driven in the direction C. The crop picked up from the field by the pick-up device 3 is fed to the pressing rollers 22 and 26, which are driven in the directions C and D respectively. The springs 29 pull the pressing roller 26 towards the pressing roller 22 so that the crop engaged by the presing rollers is compressed as it passes between them through the inlet opening 30. The crop thus enters the bale forming space 5 in the form of a carpet.

At the beginning of a bale forming operation, the rear rollers of the group 56 are turned about the shaft 52 into the position indicated by broken lines in FIG. 1, in which the free end of the group 56 lies above the inlet opening 30. The crop is passed inwardly along the bottom of the bale forming space 5 by means of the follers 41 and 42 and is moved towards the rear over the pushing member 44, the roller 63 and the driven rollers 60 and 59. The crop then comes into contact with the rollers of the group 56 mounted on the shaft 52 and is turned backwards upwardly and forwardly. In this way the core of the bale is formed. As the feed of crop continues this core becomes larger and strikes the underside of the forwardly turned group 55, which is eventually pivoted upwards about the shaft 52, the weight of the group 56 then bearing on the growing bale so that a hard stratified structure of the bale is obtained. The bale is thus compressed. The bale grows until the group 56 has reached the position indicated by solid lines in FIG. 1, when the group 56 adjoins the cylindrical boundary formed by the other rollers. This movement of the group 56 is limited by a stop (not shown). During winding up of the bale the crop is bound in the manner to be described later.

When the bale is complete the driver opens the door comprising the group 56 and the rollers 59 and 60, interconnected by the rear sections 61 of the side walls 4, by actuating the hydraulic rams 64. The door opens in the direction B so that the crop jammed between the side wall parts 61 is drawn rearwards out of the bale forming space 5, after which the bale drops from between the side wall parts 61 onto the ground when the door has turned about the shaft 49 of the upper roller 6 through a large enough angle. When the bale leaves the door and while the door is open, the group 56 turns automatically in a forward direction about the shaft 52. The forward movement can be limited by a stop (not shown). By actuating the hydraulic rams 64 in the reverse direction, the door is closed so that the turned group 56 returns to the position indicated by broken lines in FIG. 1.

During the initial stages of bale formation as described above, the pushing member 44 is moved into a downward position by the hydraulic ram 40 so that the pushing elements 65 remain out of contact, or make only light contact with, the winding crop, so that they have little influence, if any, on the crop. The hydraulic rams 40 is operated by the driver. However, when the bale nears completion, for example when only 5 more layers are to be formed, the driver operates the hydraulic rams 40 to cause the pushing member 44 to be moved upwards into the bale forming space 5, so that the tips of the star shaped pushing elements 65 extend completely inside the cylindrical space 5. The pushing member 44 rotates in the direction C. The flat tips 67 push the stalks of each layer as it is formed inwardly between the stalks of the layers formed earlier. The weight of the bale applies positive downward pressure onto the pushing member 44 for this purpose. During this process the bale continues to roll, and new layers are wound around the bale. These new layers also pass over the pushing between the stalks of the lower layers. At this stage the bale forming space has reached its maximum dimensions so that the bale as a whole is firmly compressed. This process continues until the bale is fully formed. The impressions 68 made in the bale by the tips 67 of the pushing elements 65 are indicated in FIG. 4 for successive layers of crop.

The overall effect of the pushing member 44 is to cause the four or five or more outermost layers of the bale to be plaited or braided together across the width of the bale and over the entire cylindrical periphery thereof so that the bale can be removed from the space 5 without the risk of losing parts of the layers of the bale. Even during subsequent handling of the bale, including transport of the bale to a storage place, no crop is lost. In this way binding of the bale by means of a binding device and using, for example, twine or iron wire can be dispensed with. In the known method it is difficult to remove the wire or twine, and fragments of wire can easily get mixed with the fodder, which involves the risk of cattle eating the wire and being seriosuly injured.

It should be noted that, in the context of the present invention, binding of the crop is to be understood to mean such an operation that a completed bale can be left on the field or be transported without substantial loss.

Figure 7:
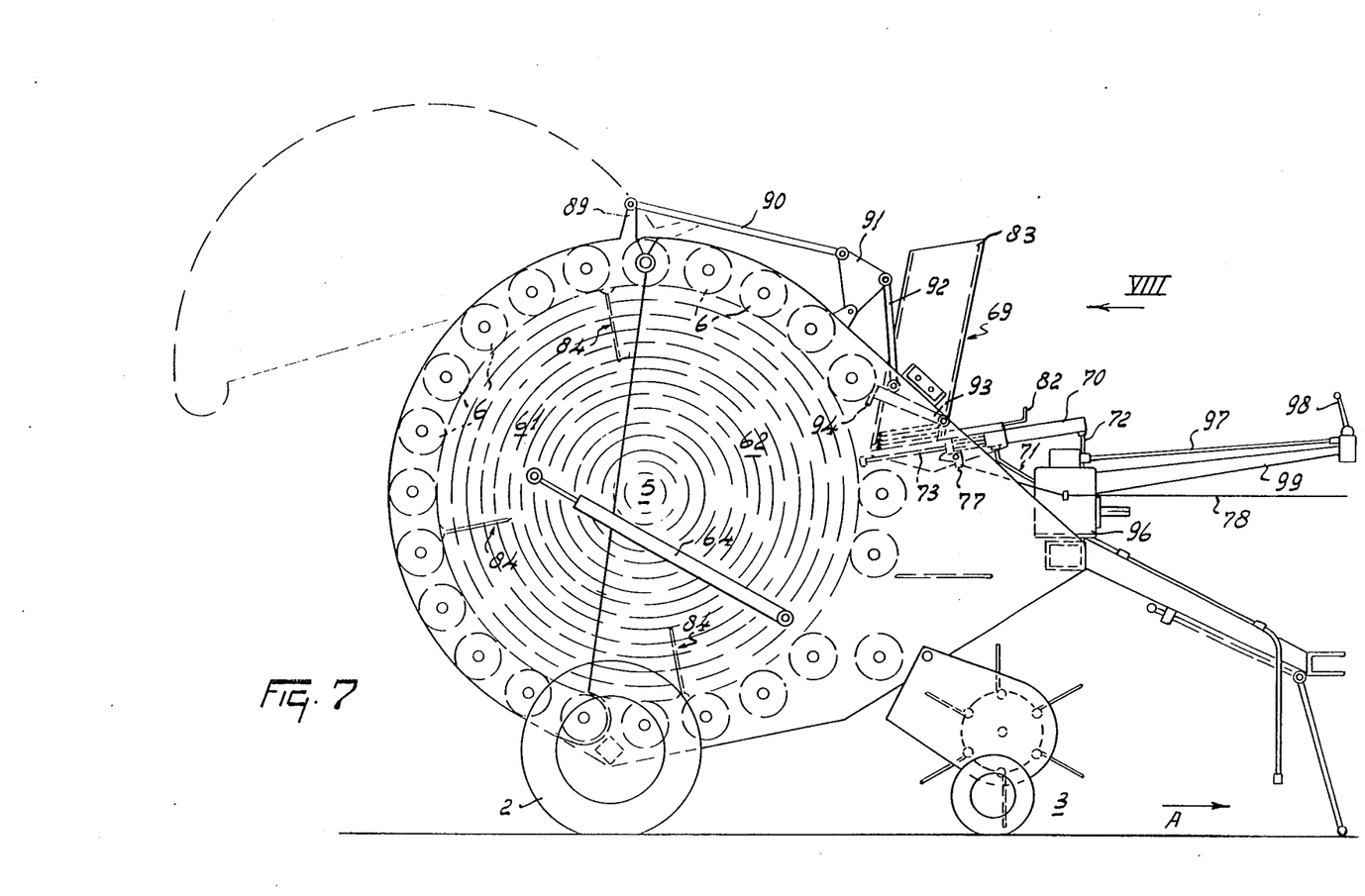
FIG. 7 is a side view of another baler.
Figure 8:
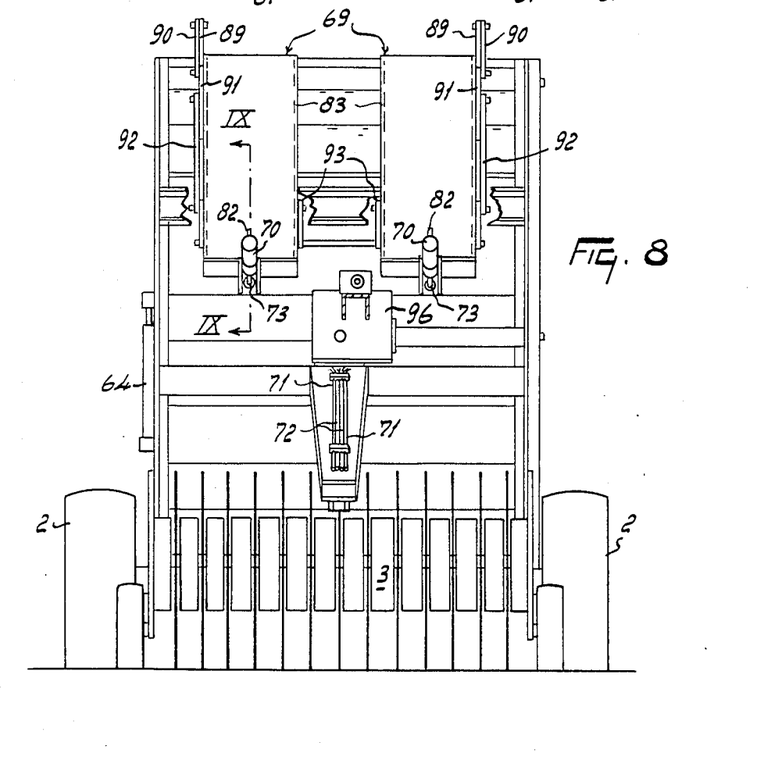
FIG. 8 is a front view taken in the direction of the arrow VIII in FIG. 7.
Figure 9:
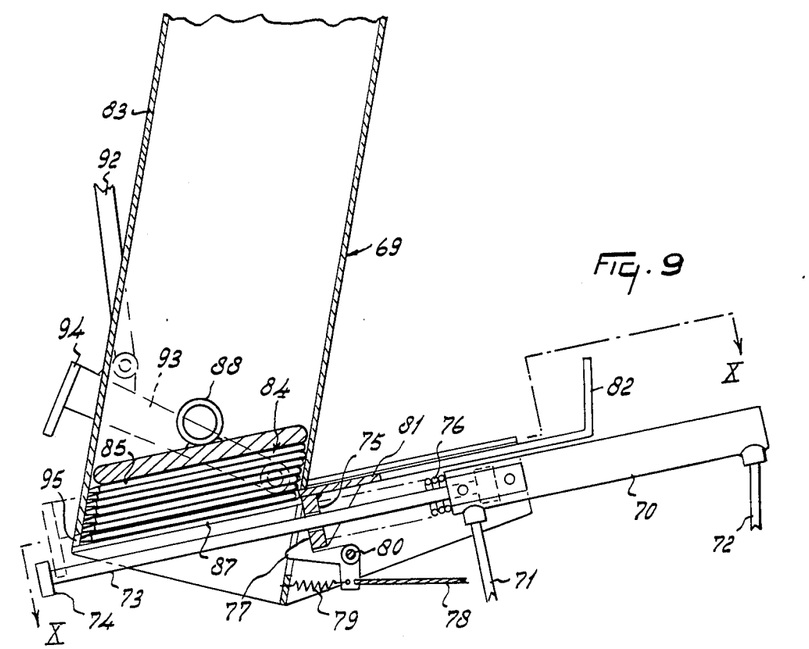
FIG. 9 is a sectional view taken on the line IX—IX in FIG. 8.
Figure 10:
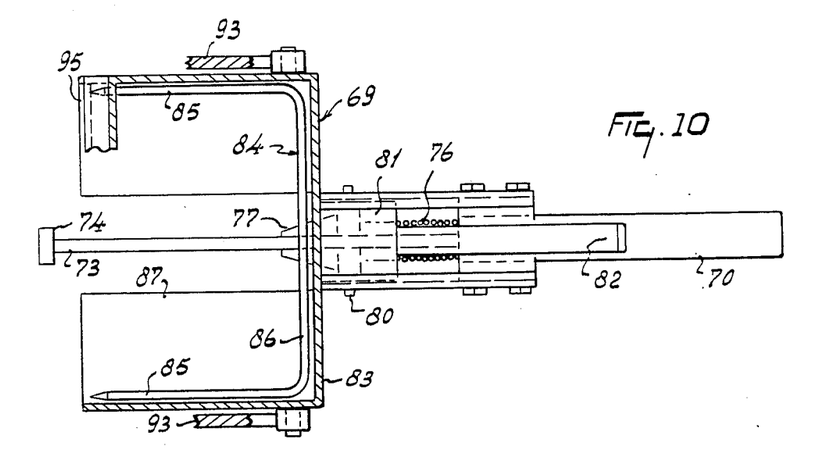
FIG. 10 is a sectional view taken on the line X—X in FIG. 9.

FIG. 7 shows a further embodiment for binding crop without the use of twine, wire or the like, which can be removed only with difficulty. Components which have already been described with reference to the embodiment of FIG. 1 are designated in FIG. 7 by the same reference numerals. The drive of the crop displacing rollers around the bale forming space 5 takes place in the same manner as in the preceding embodiment. The embodiment of FIG. 7 also uses the pivotable group of rollers 56. However, the pushing member 44 in the embodiment of FIG. 1 is replaced by a mechanism 69, which binds the bale in a different way. The device 69 (FIG. 7) is duplicated (FIG. 8) in a symmetrical manner with respect to the vertical longitudinal central plane of the baler at a height above the ground exceeding the height of the top of the drive casing 9 above the ground. The two binding mechanisms 69 are disposed so that each binding mechanism 69 is situated centrally in front of half of the bale forming space 5. Each binding mechanism 69 is constructed as shown in FIGS. 9 and 10 and is disposed at least partly between the lower roller 6 of the front group of rollers 6 and the second superjacent roller 6. The normal position for the sixth roller from the top in section 62 is omitted and two rollers 6 are provided thereunder.

The binding mechanism 69 comprises a double-action hydraulic ram 70 which is connected by hydraulic ducts 71 and 72 to the hydraulic system of the tractor. The hydraulic ram 70 is rigidly secured with respect to the frame of the baler and is disposed so that its centerline approximately intersects the centerline of the bale forming space extending transversely of the direction A.

The piston rod 73 of the hydraulic ram 70 projects towards the space 5 and, in its outermost position, it projects from the ram 70 by a length equal to about 1.3-times the length of the ram 70 itself. The rod 73 has at its end a cylindrical stop 74. The rod 73 is surrounded by an annular cup spring or washer 75 on which one end of a heavy duty compression spring 76 bears. The other end of the spring 76 bears on the neighboring end of the hydraulic ram 70. The washer 75 is held in the position shown in FIG. 9 by a latching lever 77, which can be released by means of a rope 78 from the seat of the tractor. The latching lever 77 is biassed by a tension spring 79 to turn about its axis 80 towards the position in which it engages the washer 75. The force of the spring 76 is applied to the shaft 80 by the latching lever 77. An expulsion device in the form of a slide 81 is rigidly secured to the top of the washer 75. The slide 81 extends from the washer 75 in the direction towards the ram 70 and is disposed partly above and parallel to the ram. At its end nearer the tractor, the slide 81 has an upwardly directed part 82, which is visible from the tractor seat. In the position shown in FIG. 9, a magazine 83 extends upwardly from a position between and above the space between the stop 74 and the adjacent end of the slide 81. The magazine 83 preferably slopes slightly to the front from bottom to top. The magazine 83 is hollow and encloses a rectangular space accommodating binding means 84 in a lying position.

The binding means (FIG. 10) comprises binding elements made from metal or a rigid synthetic resin. Each binding element has two mutually parallel spaced pins 85 of circular cross section, which are pointed at their free ends. The pins 85 are interconnected by an intermediate piece 86, which is integral with the pins 85. The binding elements 84 can thus be regarded as U-shaped. The assembly is disposed so that the binding elements 84 are narrowly enclosed within the magazine 83 and are stacked in a slightly echelon configuration, the points of the pins 85 being directed towards the space 5. It would be conceivable to use individual straight pins 35 having transverse parts at the ends away from their points. The magazine 83 has a bottom 87, which is not completely closed but has a central opening in the form of a slot along which the top of the washer 75 can move. The stack of binding elements 84 can be loaded at the top by a removable weight 88, which fits closely in the magazine 83 and which prevents the underlying binding elements 84 from being jolted upwards during travel on uneven ground.

As shown in FIG. 7, the door (constituted by the components 56,59,60,61 of FIG. 1) is provided near its pivotal axis at the top of the baler with a lever 89 connected to a pivotable linkage 90,91,92 extending from the lever 89 over the front top region of the baler, the lower end of the rod 92 terminating near the underside of the magazine 83. The rod 92 is disposed directly to one side of the magazine 83 and is pivoted at its lower end to a safety catch 93 which is pivotally connected at its front end (with respect to the direction A) with the side wall of the magazine 83. When the door 61 of the baler is closed, the safety catch 93 is in the position indicated by solid lines in FIG. 9, but when the door is open, as indicated by broken lines in FIG. 7, the catch 93 is turned downwardly into the position indicated by broken lines in FIG. 9. At the front end of the safety catch 93 is welded a downwardly directed plate 94 which, in the position indicated by broken lines, closes a horizontal slot 95 in the underside of the rear wall of the magazine 83. The slot 95 extends across the width of the magazine 83, its lower boundary being constituted by the magazine's bottom 87. The height of the opening 95 is equal to or slightly larger than the thickness of each binding element.

When a bale in the space 5 is ready or almost ready, and when the binding mechanism 69 is in the position shown in FIGS. 9 and 10, the tractor driver pulls the rope 78 so withdrawing the latching lever 77 from the washer 75. The compressed spring 76 pushes the washer 75 together with the slide 81 fastened thereto vigorously towards the stop 74. The end of the slide 81 adjacent the washer 75 can enter the magazine 83 facing the ram 70 and this end shoots the lowermost binding element 84, bearing on the bottom 87, forcibly out of the slot 95 into the bale in the space 5. The pointed pins 85 of the binding element 84 penetrate between the fibers of the bale until the intermediate piece 86 contacts the outer periphery of the bale so that the element is arrested. The elements 84, having penetrated into the bale, force the fibers of a number of layers together so that a binding of the bale is achieved, and substantially no crop parts will be lost when the bale is deposited on the field or transported. The elements 84 can be shot simultaneously pairwise, side by side, by the two binding mechanisms 89 into the bale, or they can be shot one after the other. Since the bale contained in the winding space 5 is turning while the elements 85 are inserted, the driver can shoot pairs of elements, at, for example, four or more places around the periphery of the bale so that loosening of crop parts is avoided by the binding elements.

It should be noted that the dimensions of the binding elements 84 are such that, even if they become mixed up with the fodder, they cannot be eaten by the animals. Binding elements shot into bales of crop can later be recovered from the bales and used repeatedly.

When a binding element 84 is shot into a bale by one of the binding mechanisms 69, the mechanism is cocked by supplying pressurized fluid through the hydraulic duct 71 to the ram 70. As a result the rod 73 with the stop 74 and the washer 75 (then in contact with the stop 74) are retracted towards the ram 70 until the washer 75 depresses the latching lever 77 so that the washer 75 re-engages the latching lever 77 under the action of the tension spring 76. Hydraulic fluid is then supplied through the duct 72 so that the rod 73 and the stop 74 again move outwards into the position indicated in FIG. 9. In this position the mechanism is again ready for use. The position of the part 82 of the slide 81 provides an indication to the driver on his seat whether the mechanism is ready for operation or whether it has to be moved into the cocked position.

When the door is open, as explained above, the safety catch 93 with its plate 94 is turned down in front of the slot 95 of the magazine 83. This avoids the danger that persons standing behind the open outlet opening of the space 5, after a bale has been discharged from the baler, might be struck by binding elements erroneously fired by one of the binding mechanisms 69.

In the embodiments described above the stalks of the crop are compressed together during the compression of the bale to such an extent that the usual binding means for the bale may be dispensed with.

An important advantage of the binding systems in accordance with the present invention, however, is that no additional time is required for binding the bales in contrast to the mode of operation of known devices in which the travel over the field has to be stopped while binding of the bale takes place so that much time is lost.

It would be possible to use the binding system of FIGS. 1 to 6 (using the pushing member 44) in combination with that of FIGS. 7 to 10 in the same baler.

The crop displacing rollers bounding the bale forming space 5 of the baler shown in FIG. 7 could be driven at different speeds by means of interchangeable wheels 11 and 12 referred to with reference to FIGS. 1 to 6, but FIG. 7 shows a change-speed gear-box 96 disposed at the front of the baler, the operation of which corresponds, in principle, to that of a manually operated gearbox of an automobile. The gearbox 96 can be operated through a Bowden cable 97 by a lever 98 placed within reach of the driver's hand. The lever is mounted at the front end of a forwardly projecting carrier 99 of the baler.

The binding means 44 of FIGS. 4 to 6 and 84, 85 of FIGS. 7 to 10 have dimensions which are an order or magnitude smaller than those of known arrangements using ropes wound several times about a bale. The binding means embodying the invention provide multiple but local adherence of the stalks of the crop.

Although various features of the balers described and illustrated will be set forth in the following claims as inventive features, the invention is not necessarily limited to these features and may encompass all inventive features disclosed both individually and in various combinations.

I claim:

1. A baler comprising a pick-up device for picking up crop lying on the ground, and a bale forming space, the baler further comprising means for binding formed bales which comprises means for penetrating peripheral layers of the bale so as to interconnect said layers to provide the bale with sufficient binding cohesion so that there is no need for applying twine, wire, plastic sheet or the like around the bale.

2. A baler comprising a pick-up device for picking up crop lying on the ground, and a bale forming space, the baler further comprising means for binding formed bales which comprises means for penetrating peripheral layers of the bale to provide the bale with sufficient binding cohesion so that there is no need for applying twine, wire, plastic sheet or the like around the bale, said penetrating means comprising a binding mechanism for displacing a binding element inwardly of the bale thereby to interconnect layers of crops in the peripheral part thereof.

3. A baler as claimed in claim 1 wherein said penetrating means comprises a pushing element adapted to displace stalks of a layer of crop of a bale into a further layer of such bale.

4. A baler as claimed in claim 3 in which said pushing element, in operation, displaces stalks inwardly of the bale.

5. A baler as claimed in claim 3 in which said pushing element comprises tooth-like projections.

6. A baler as claimed in claim 3 in which said pushing element is rotatable.

7. A baler as claimed in claim 3 in which said pushing element comprises two interconnected mutually parallel plates.

8. A baler as claimed in claim 61 in which said pushing element comprises star-shaped plates.

9. A baler as claimed in claim 66 in which said plates project freely as edges at the periphery of said pushing element.

10. A baler as claimed in claim 7 further comprising a drivable shaft, said pushing element and at least one further like pushing element being mounted side by side on said drivable shaft and extending substantially at right angles to said drivable shaft and to the centerline of said bale forming space.

11. A baler as claimed in claim 10 in which adjacent ones of said pushing elements are angularly off-set about the axis of said shaft with respect to each other.

12. A baler as claimed in claim 3 in which said pushing ellement is displaceable out of an operative position.

13. A baler as claimed in claim 12 comprising a hydraulic ram in which said pushing element is displaceable by said hydraulic ram into and out of its operative position.

14. A baler as claimed in claim 3, in which, when operative, said pushing element projects into said bale forming space.

15. A baler as claimed in claim 3, further comprising two crop-displacing members disposed in the lower region of the bale forming space, said pushing element being siutated between said crop-displacing members.

16. A baler as claimed in claim 1, further comprising binding elements for insertion by said penetrating means into a bale of crop to interconnect layers of said crop.

17. A baler comprising a pick-up device for picking up crop lying on the ground, a bale forming space and a plurality of binding elements for insertion into a bale thereby to secure together several layers of said crop in the bale.

18. A baler as claimed in claim 17, in which each said binding element has a portion of circular cross-section.

19. A baler as claimed in claim 17, in which each said binding element is pointed.

20. A baler as claimed in claim 17, in which each said binding element comprises two pins which are interconnected by an intermediate piece.

21. A baler as claimed in claim 20, in which said two pins and said intermediate piece constitute a substantially U-shaped binding element.

22. A baler as claimed in claim 17, in which said binding element comprises two substantially parallel pins having free ends which are directed inwardly of the bale.

23. A baler comprising a pick-up device for picking up crop lying on the ground, a bale forming space and a binding mechanism for displacing a binding element inwardly of a bale thereby to interconnect layers of crop in said bale.

24. A baler as claimed in claim 23, in which said binding mechanism comprises energy storage means for ejecting said binding element into said bale.

25. A baler as claimed in claim 24, in which said energy storage means comprises a spring.

26. A baler as claimed in claim 25, in which said spring is adapted to be stressed by means of a hydraulic ram.

27. A baler as claimed in claim 23, further comprising energy storage means and an expulsion device which is movable by said energy storage means and bears on said binding element.

28. A baler as claimed in claim 27, in which said expulsion device comprises means indicating the condition of said binding mechanism.

29. A baler as claimed in claim 27, in which said expulsion device engages said binding element which is lowermost of a stack of like binding elements.

30. A baler as claimed in claim 29, in which said stack is accommodated in a storage space having an outlet for said binding element.

31. A baler as claimed in claim 30, further comprising a door which is adapted to be swung open for discharging bales from said bale forming space, said door being coupled with a safety mechanism for closing said outlet opening when said door is open.

32. A baler as claimed in claim 23 comprising means for actuating said binding mechanism from a tractor propelling the baler.

33. A baler as claimed in claim 23, in which said binding mechanism is disposed on the front of the baler.

34. A baler as claimed in claim 23, in which two said binding mechanisms are provided which are spaced at a distance from each other.

35. A baler as claimed in claim 1, further comprising two co-operating rollers which are situated near said pick-up device, between which rollers said crop is compressed.

36. A baler as claimed in claim 35 in which said rollers are parallel to each other and one of said rollers is resiliently biassed towards the other.

37. A baler as claimed in claim 36 comprising means for driving said rollers.

38. A baler as claimed in claim 36, in which said rollers are directly adjacent said pick-up device and define an opening for receiving crop from said pickup device.

39. A baler as claimed in claim 35 in which the diameter of said cylindrical rollers is about thirty centimeters.

40. A baler as claimed in claim 1, which is adapted for winding crop to form cylindrical bales.

41. A baler as claimed in claim 1, comprising means for compressing crop into cylindrical bales.

42. A baler as claimed in claim 1 comprising means for forming bales having a diameter of at least about 150 to 180 centimeters and a width of at least about 120 to 150 centimeters.

43. A baler as claimed in claim 1 comprising a boundary for said bale forming space defined by crop-displacing members.

44. A baler as claimed in claim 43 comprising means for driving said crop-displacing members at two or more speeds.

45. A baler as claimed in claim 44, in which driving means comprises a drive casing having interchangeable gear wheels.

* * * * *